United States Patent [19]
Phan

[11] Patent Number: 6,106,336
[45] Date of Patent: Aug. 22, 2000

[54] COMPUTER SYSTEM INCLUDING A CO-PLANAR PROCESSOR CONNECTOR AND THERMAL SPACER

[75] Inventor: Truong Phan, Hillsboro, Oreg.

[73] Assignee: Intel Corporation, Santa Clara, Calif.

[21] Appl. No.: 08/936,859

[22] Filed: Sep. 24, 1997

[51] Int. Cl.[7] .................................................. H01R 23/70
[52] U.S. Cl. ............................................................ 439/631
[58] Field of Search .................................... 361/687, 684, 361/744, 803, 788, 785, 733; 439/63, 65, 67, 631

[56] References Cited

U.S. PATENT DOCUMENTS

| | | |
|---|---|---|
| 4,660,920 | 4/1987 | Shibano . |
| 4,869,672 | 9/1989 | Andrews, Jr. . |
| 4,981,449 | 1/1991 | Buchter . |
| 5,013,265 | 5/1991 | Buchter et al. . |
| 5,052,936 | 10/1991 | Biechler et al. . |
| 5,282,114 | 1/1994 | Stone . |
| 5,295,852 | 3/1994 | Renn et al. ............................. 439/328 |
| 5,407,365 | 4/1995 | Lin . |
| 5,472,354 | 12/1995 | Chen et al. ............................. 439/357 |
| 5,531,615 | 7/1996 | Irlbeck et al. .......................... 439/631 |
| 5,599,595 | 2/1997 | McGinley et al. . |
| 5,729,431 | 3/1998 | Marwah et al. . |
| 5,764,924 | 6/1998 | Hong . |
| 5,928,036 | 7/1999 | Thrush .................................... 439/631 |

OTHER PUBLICATIONS

Patent Cooperation Treaty's International Search Report for International application No. PCT/US98/14995, dated Jan. 26, 1999, 5 pgs.

*Primary Examiner*—Khiem Nguyen
*Assistant Examiner*—Michael C. Zarroli
*Attorney, Agent, or Firm*—Blakely, Sokoloff, Taylor & Zafman LLP

[57] ABSTRACT

A computer system is formed using a co-planar processor connector to connect a motherboard and a processor package together in a co-planar manner. The co-planar processor connector includes a planar body having an inner cavity defined a number of inner walls extending from one end to the other end, and a number of pins disposed on the inner walls, extending from one end to the other end. The co-planar connector engages the motherboard at one end, and the processor package at the other end. The pins electrically couple the processor package to the motherboard.

10 Claims, 5 Drawing Sheets

COMPUTER SYSTEM INCLUDING A CO-PLANAR PROCESSOR CONNECTOR AND THERMAL SPACER

BACKGROUND OF THE INVENTION

1. Field of the Invention

The present invention relates to the field of computer systems. More specifically, the present invention relates to the art of coupling a processor to a motherboard of a computer system.

2. Background Information

Microprocessor based personal computers are known in the art, including personal computers employing low profile form factors. Traditionally, low profile personal computers have employed zero insertion force (ZIF) sockets to couple processors to the motherboards. Historically, the manner in which processors are coupled to the motherboards has not been an issue that needs to be addressed in achieving low profile, as the processors generally have a very low profile. However, recent advances in microprocessor technology have led to certain high performance microprocessors to employ a "cartridge" like approach to packaging, and single edge card connector (SECC) technology to connect the processor packages to the motherboards. Because of the high performance nature of these processors, typically heat sinks with substantial masses have to be employed to dissipate the heat generated by these processors. The first generation SECC processor packages are coupled to the motherboards with the two components occupying orthogonal planes, as a result constraining the low profile that can be achieved. Thus, a new non-orthogonal approach to coupling these new high performance SECC processor packages and motherboards is desired.

SUMMARY OF THE INVENTION

A method for forming a computer system is disclosed. A co-planar processor connector is connected to a motherboard. A processor package is then in turn connected to the co-planar connector with the motherboard and the processor package being co-planar with each other.

A computer system formed using the above disclosed method is disclosed. The computer system includes a motherboard, a co-planar processor connector, and a processor package, interconnected as disclosed. In one embodiment, the computer system further includes a system chassis, and a number of spacers attaching the processor package to a wall of the system chassis.

A co-planar processor connector for use to form the above disclosed computer system is disclosed. The connector includes a planar body having an inner cavity defined by a number of inner walls extending from one end to the other end, and a number of pins disposed on the inner walls, extending from one end to the other end. The processor connector receives a motherboard at one end, and a processor package at the other end, in the above disclosed co-planar manner. The pins electrically couple the processor package to the motherboard.

A method for dissipating heat generated by a processor package is disclosed. The processor package is thermally coupled to a wall of a system chassis. In one embodiment, the wall is parallel to the processor package, and thermally conductive spacers are used to facilitate the attachment. Heat generated during operation are channeled through the spacers to the chassis for dissipation.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1A:
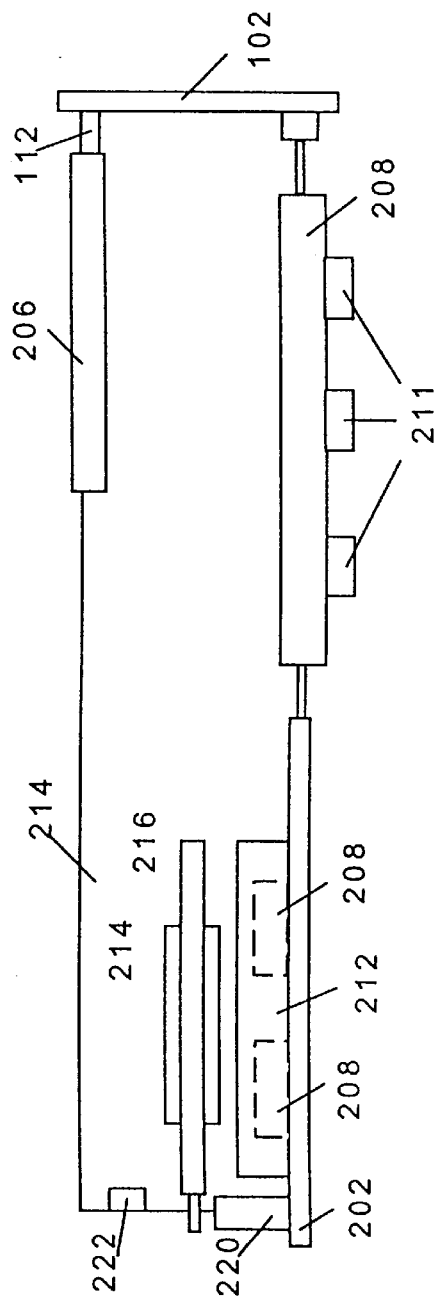
FIGS. 1a–1b illustrate a side view and a top view of an exemplary motherboard having a processor package attached thereto in accordance with the teachings of the present invention.
Figure 1B:
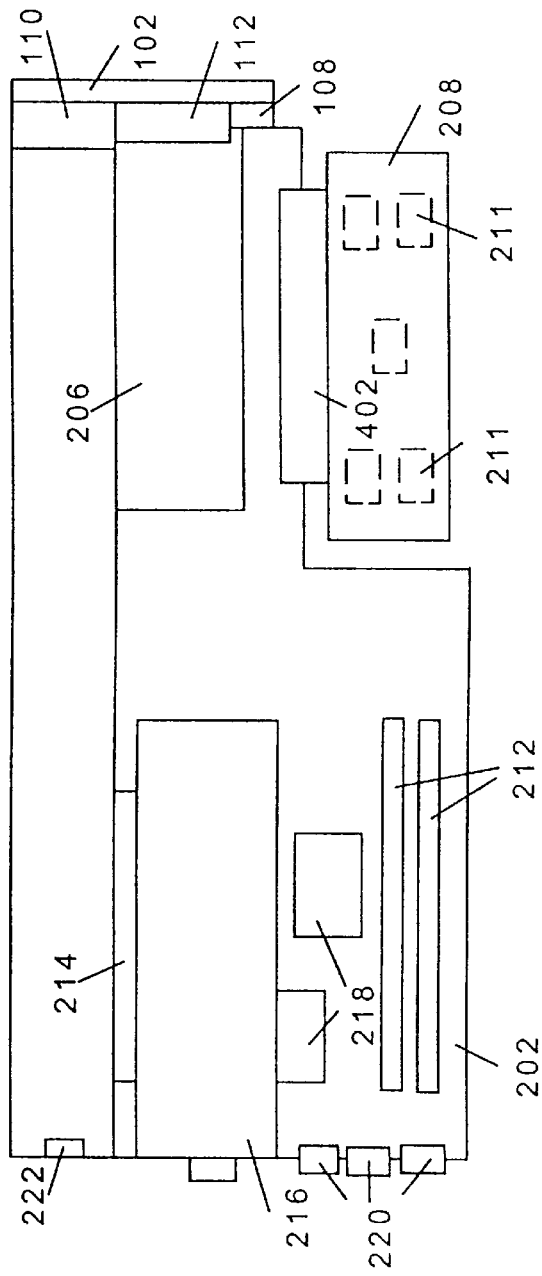

Referring now to FIGS. 1a–1b, wherein a side view and a top view of an exemplary motherboard having a processor package attached to it in accordance with the teachings of the present invention are shown. As illustrated, in accordance with the teachings of the present invention, processor package 208 is attached to motherboard 202 employing co-planar processor connector 402 of the present invention. Processor package 208 is a cartridge like package employing SECC technology. An example of processor package 208 is disclosed in copending U.S. patent application, Ser. No. 08/739,815, filed on Oct. 30, 1996, entitled A Processor Card Assembly.

Co-planar processor connector 402 is first attached to motherboard 202 co-planar with motherboard 202. Processor package 208 is then attached to co-planar processor connector 402 with processor package 208 and motherboard 202 also co-planar to each other.

In addition to processor package 208, motherboard 202 also has a number of other components attached to it, such as memory modules 212, I/O ports 220, and add-on card 216. For the illustrated embodiment, add-on card 216 is attached to motherboard 202 using right angle add-on card connector 214. Examples of memory modules 212 includes single in-line memory modules (SIMM) or dual in-line memory modules (DIMM), whereas examples of I/O ports 220 include keyboard, mouse, serial and parallel ports. An example of add-on card 216 is a Peripheral Component Interconnect (PCI) add-on card with a PCI agent disposed thereon. The PCI agent is to be coupled to a PCI bus disposed on motherboard 202, and having to meet the high performance PCI signal requirements. Right angle add-on card connector 214 is first attached to motherboard 202 in a direction orthogonal to motherboard 202. Add-on card 216 is then attached to right angle add-on card connector 214 with add-on card 216 and motherboard 202 occupying parallel planes. Right angle add-on card connector 214 is the subject of U.S. patent application, Ser. No. 08/936,857, filed contemporaneously, entitled A Computer System Including Right Angle Processor and Add-On Card Connectors, which is hereby fully incorporated by reference.

For the illustrated embodiment, motherboard 202 including the above described elements is attached to riser card 102. Attached also to riser card 102 is power supply 204, fixed drive 206, and optionally, diskette drive 224. For the illustrated embodiment, power supply 204 spans the entire length of motherboard 202, and having receptacle 222 disposed at the other end to receive external AC power. In a preferred embodiment, riser card 102 includes a number of intercomponent cabling elimination features disposed on its rear (interior facing) surface and its front (exterior facing) surface. The features disposed on the interior facing surface includes motherboard connector 108, power supply connector 110, fixed drive connector 112 and diskette drive connector 114 for directly connecting motherboard 202, power supply 204, fixed drive 206 and diskette drive 224 to riser card 102, without employing cabling. The features disposed on the exterior facing surface includes a power on/off button for powering the host computer system on/off, a number of I/O ports for coupling external I/O devices to the host computer system, visual indicators and display area for providing visual indicators and messages to a user of the host computer system. Riser card 102 is the subject of U.S. patent application, Ser. No. 08/935,475 (now U.S. Pat. No. 5,935,227), filed contemporaneously, entitled A Computer System Including A Riser Card With Multiple Inter-Component Cabling Elimination Features, as well as the subject of U.S. patent application, Ser. No. <to be assigned>, filed contemporaneously, entitled A Computer System Including A Riser Card And A Chassis With Serviceability Features, which are both hereby fully incorporated by reference.

Figure 2:
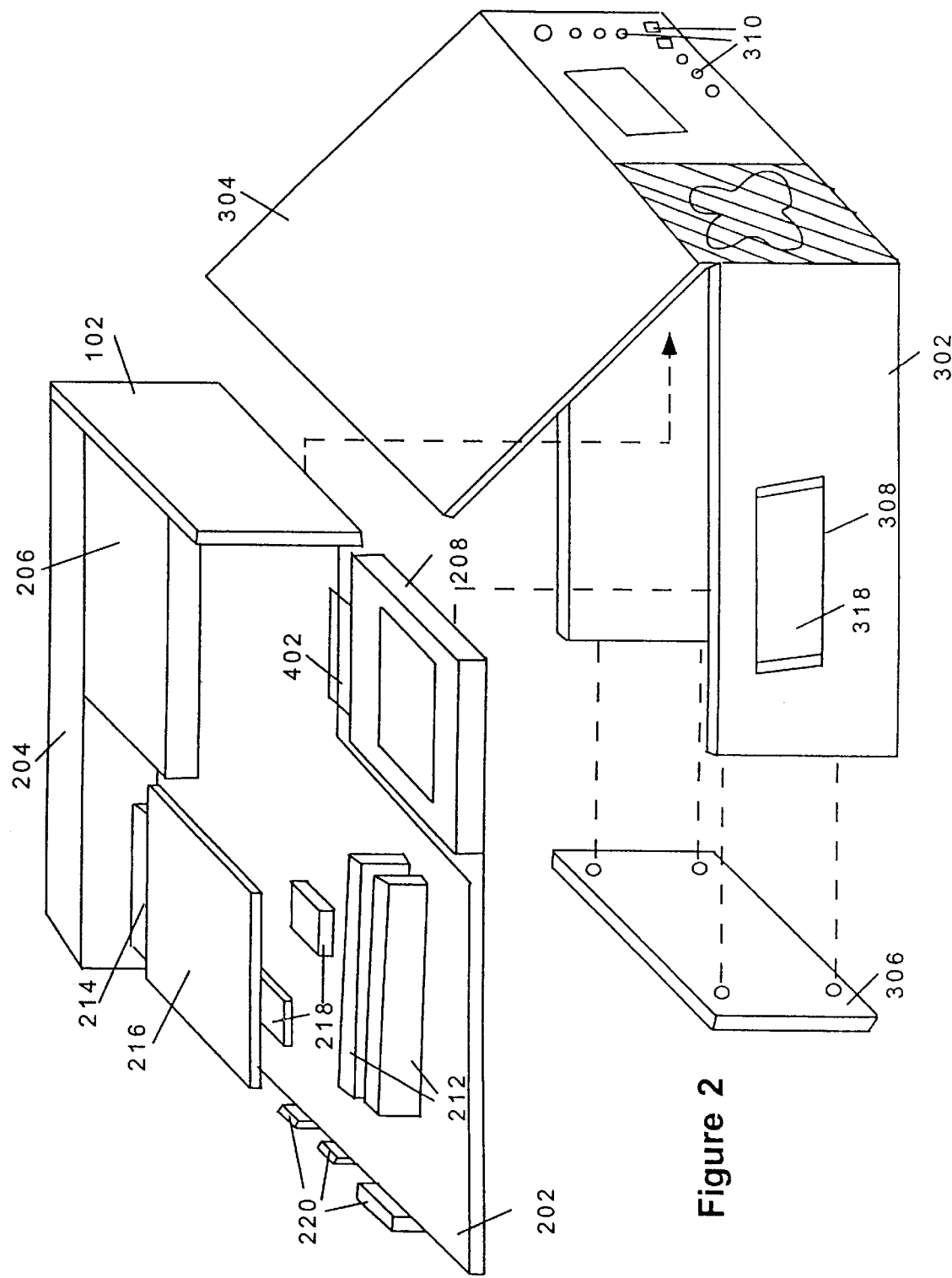
FIG. 2 illustrates how the interconnected components can be placed into a chassis to form a low profile computer system in accordance with one embodiment of the present invention.

FIG. 2 illustrates in further detail how the interconnected components are placed into a chassis to form a low profile computer system in accordance with one embodiment of the present invention. The illustration is presented from a perspective view of the exemplary system. As illustrated, the interconnected elements, including motherboard 202, co-planar processor connector 402, processor package 208, etc., are placed into chassis 302 to form exemplary computer system 400. The interconnected elements are placed into chassis 302 in a manner such that riser card 102 is disposed directly behind the front wall of chassis 302. For the illustrated embodiment, a number of thermally conductive spacers 211 (see FIG. 1) are employed to thermally couple the processor package to the bottom wall of system chassis 302. In other words, for the illustrated embodiment, system chassis 302 also functions as a heat sink for processor package 208.

Additionally, for the illustrated embodiment, chassis 302 also includes corresponding openings 310 disposed on the front wall to externalize the cabling elimination features disposed on the exterior facing surface of riser card 102. Furthermore, chassis 302 includes hinged top cover 304 and back panel 306, which when assembled, render chassis 302 effectively sealed. An effectively sealed chassis is a chassis that requires special tool and/or extraordinary effort on the part of a use to open the chassis. However, sealed chassis 302 includes covered opening 308 with sliding cover 318, which can be slid in one direction to temporally uncover opening 308 to provide access to servicing components located proximately adjacent to opening 308, without requiring chassis 302 to be unsealed. Chassis 302 is the subject of the above identified incorporated by reference co-pending U.S. patent application, Ser. No. <to be assigned>.

As a result, exemplary computer system 400 can achieve a low profile, notwithstanding the fact that processor package 208 is a cartridge like package that employs SECC technology, such as the processor package disclosed in the above identified co-pending U.S. patent application, Ser. No. 08/739,815, which otherwise requires a very large heat sink to remove the heat generated by processor package 208 during operation.

Figure 3:
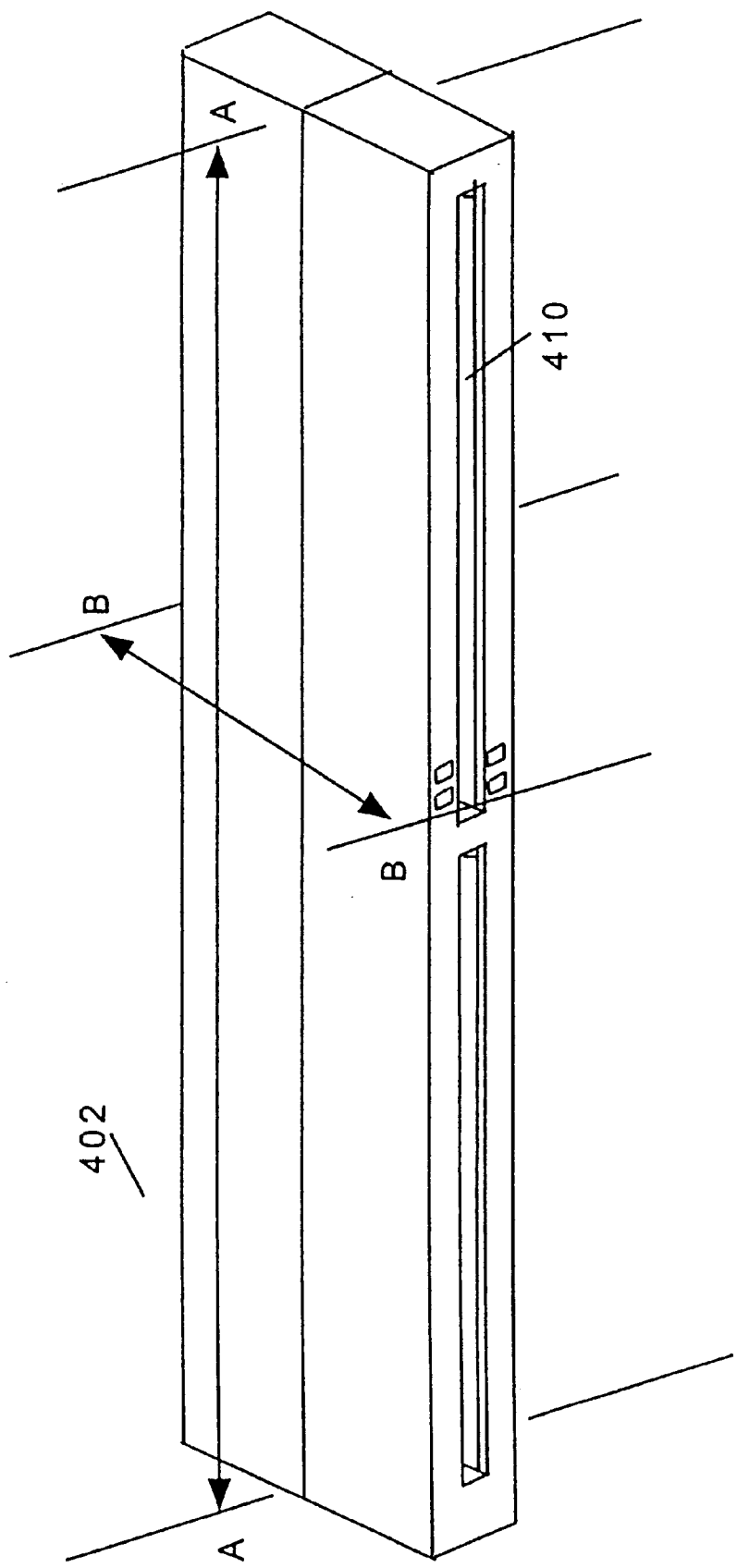
FIGS. 3–5 illustrate one embodiment of the co-planar processor connector of the present invention.
Figure 4:
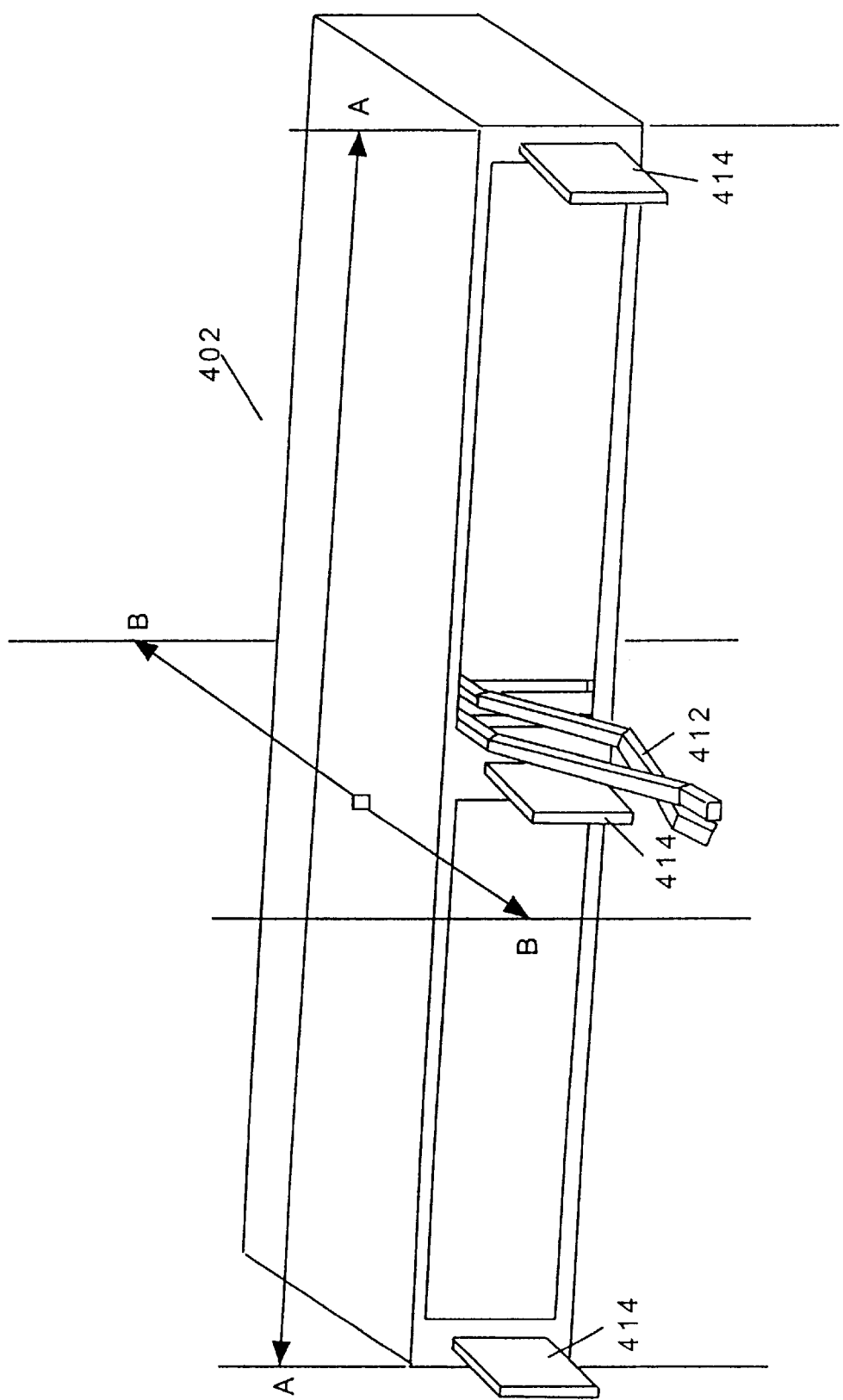
Figure 5:
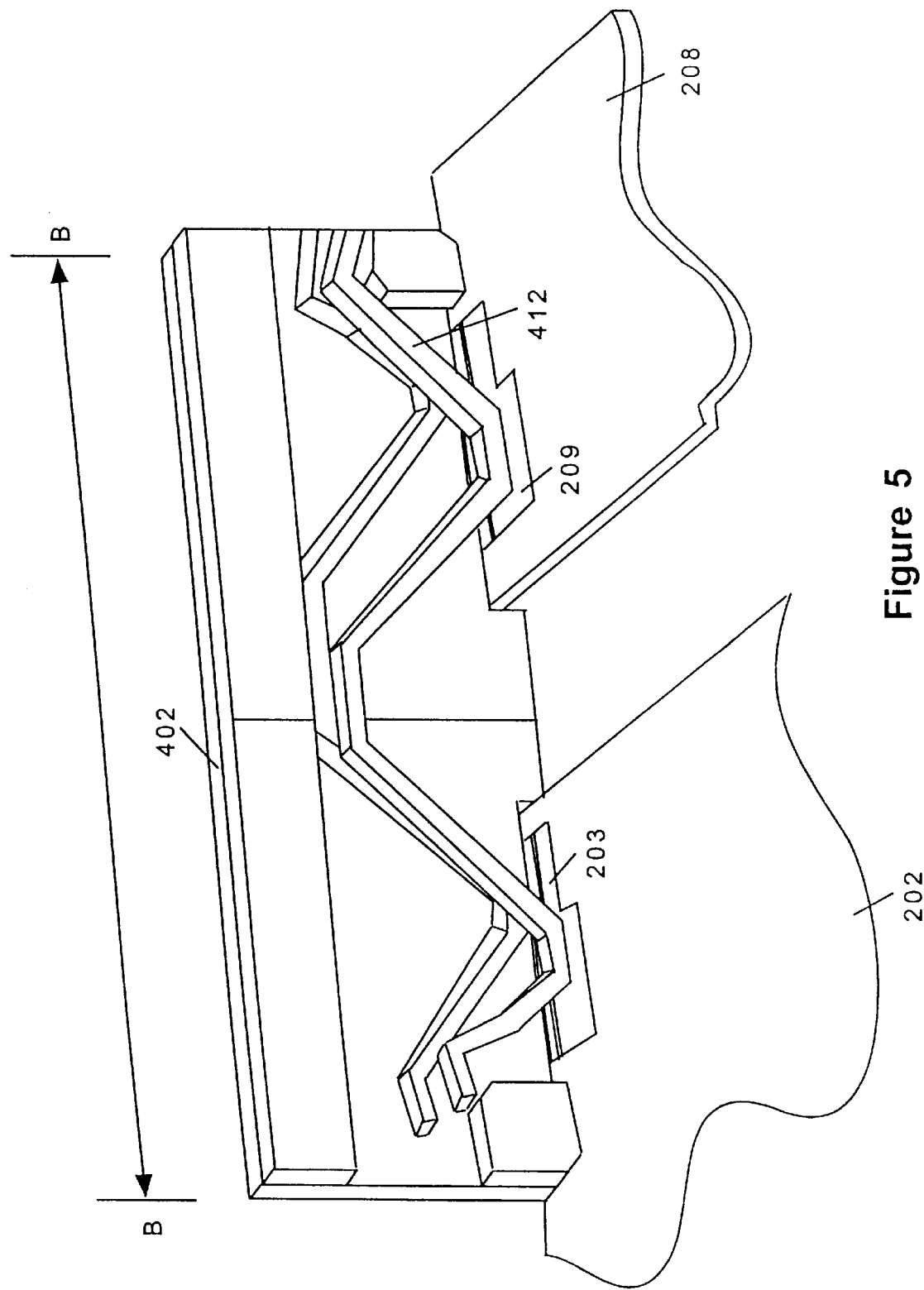

FIGS. 3–5 illustrates one embodiment of co-planar processor connector 402 in further detail. FIG. 3 is a perspective view of connector 402. FIGS. 4–5 are cross sectional views of connector 402 taken at two different axes, A—A and B—B respectively. As shown, for the illustrated embodiment, co-planar processor connector 402 includes two-part main body 408 having a motherboard end (the end that engages with motherboard 202) and a processor end (the end that engages with processor package 208). For the illustrated embodiment, the two parts are snapped together using guides 414 (see FIG. 4, which is the cross sectional view taken along axis A—A with the motherboard end of the two part main body removed).

Main body 408 has inner cavity 410 defined by a number of inner walls, extending from the processor end to the motherboard end. Main body 408 also includes a number of pins 412 disposed along the inner walls, extending from the processor end to the motherboard end. For ease of illustration, only one pair of pins 412 is illustrated in the cross sectional view of FIG. 4. Those skilled in the art will appreciate that there are many more pins involved. However, the precise number of the pins involved is application dependent, that is, depending on the type of motherboard and processor package being coupled together.

Co-planar processor connector 402 receives processor package 208 at the processor end, with processor package 208 and motherboard 202 occupying the same plane (see FIG. 2 and FIG. 5, which is the cross sectional view taken along axes B—B). Processor package 208 is electrically coupled to motherboard 202 by pins 412 disposed on the inner walls of main body 408. As illustrated in FIG. 5, pins 412 electrically engage fingers 203 and 209 of motherboard 202 and processor package 208 respectively.

Those skilled in the art will appreciate that the disclosed invention may be practiced with modifications and alterations within the spirit and scope of the appended claims. Accordingly, the above description is to be regarded as illustrative but not restrictive of the present invention.

Thus, a computer system including a co-planar processor connector has been disclosed.

What is claimed is:

1. A computer system with a low profile, comprising:
    a) a motherboard;
    b) a processor package;
    c) a processor connector connecting the motherboard and the processor package in a co-planar manner;
    d) a chassis having a plurality of chassis walls;
    e) a plurality of thermally conductive spacers attached to the processor package and one of the chassis walls to secure the processor package, and to facilitate employment of the chassis as a heat sink for the processor package to dissipate heat generated by the processor package.

2. The computer system as set forth in claim 1, wherein the planar main body of the processor connector comprises of two parts snapped together.

3. The computer system as set forth in claim 2, wherein at least one part of the two part planar main body of the processor connector comprises a plurality of guides for facilitating snapping the two parts of the main body of the processor connector together.

4. The computer system as set forth in claim 1, wherein the spacers attach the processor package to a base wall of the chassis.

5. The computer system as set forth in claim 1, wherein the computer system further comprises:
   d) an add-on card connector having
      d.1) an L-shaped main body, including a second inner cavity defined by a second plurality of inner walls extending from a third end to a fourth end, to be mechanically attached upside down to the motherboard with the upside down L-shaped main body and the motherboard being orthogonal to each other,
      d.2) a second plurality of pins disposed on the second inner walls of the second inner cavity extending from the third end through the fourth end to be electrically connected to the motherboard, and
   e) an add-on card mechanically engaged with the second inner cavity at the third end of the add-on card connector with the add-on card and the motherboard occupying parallel planes, and electrically coupled to the motherboard through the second plurality of pins.

6. The computer system as set forth in claim 5, wherein the L-shaped main body of the add-on card connector is augmented at its sides with mounting steps to facilitate said upside down mechanical attachment to the motherboard.

7. The computer system as set forth in claim 5, wherein the upside down L-shaped main body including the augmented mounting steps in conjunction with the motherboard define an exterior cavity having a height sufficient to accommodate a predetermined number of components attached to the motherboard.

8. The computer system as set forth in claim 5, wherein the add-on card connector is a PCI add-on card connector, and the add-on card comprises a PCI agent that is to be electrically located within a predetermined distance from the motherboard to be connected to a PCI bus disposed on the motherboard.

9. A method for forming a computer system, comprising:
   a) attaching a processor connector having a planar body including an inner cavity defined by a plurality of inner walls extending from a first end to a second end, to a motherboard;
   b) attaching a processor package to the processor connector, co-planar with the motherboard, the processor connector further having a plurality of pins extending from the first end to the second end to electrically couple the processor package to the motherboard; and
   c) attaching the processor package to a wall of a computer chassis using a plurality of thermally conductive spacers.

10. The method of claim 9 wherein step (c) comprises attaching the processor package to a base wall of a computer chassis using the plurality of thermally conductive spacers.

* * * * *

UNITED STATES PATENT AND TRADEMARK OFFICE
CERTIFICATE OF CORRECTION

PATENT NO.    : 6,106,336　　　　　　　　　　　　　　　　　　　　Page 1 of 1
DATED         : August 22, 2000
INVENTOR(S)   : Truong Phan It is certified that error appears in the above-identified patent and that said Letters Patent is hereby corrected as shown below:

Column 3,
Line 26, delete "⟨to be assigned⟩" and insert -- 08,936,858 --.

Signed and Sealed this

Ninth Day of April, 2002

Attest:

JAMES E. ROGAN
Attesting Officer　　　Director of the United States Patent and Trademark Office